Figure 1:
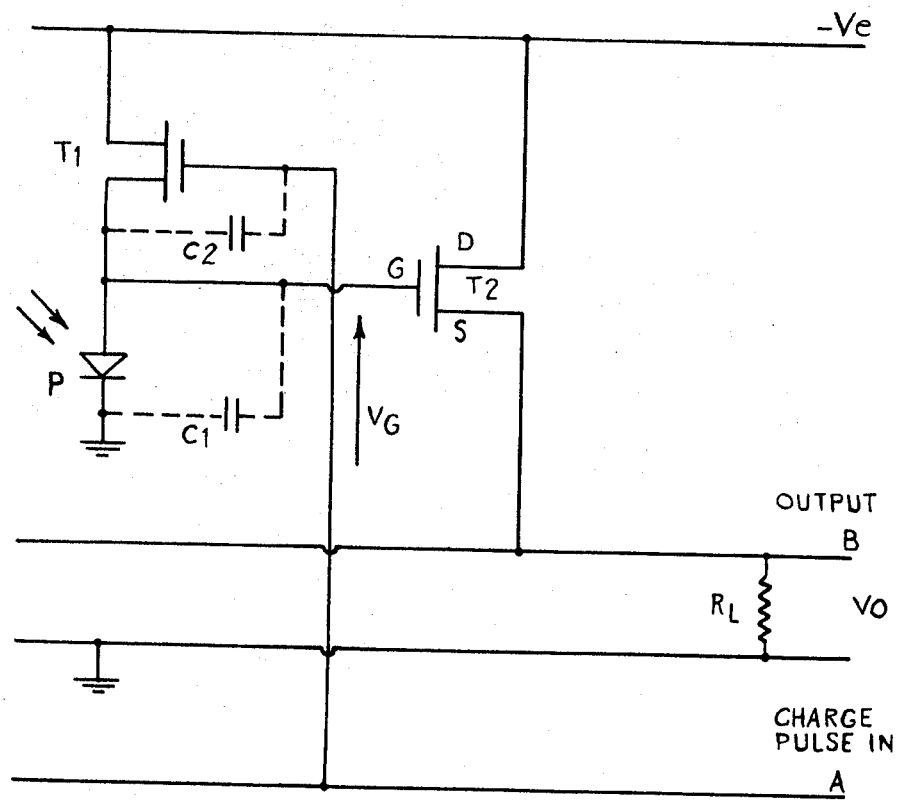

United States Patent [19]
Poynton et al.

[11] 3,727,068
[45] Apr. 10, 1973

[54] BOTTLE INSPECTION APPARATUS

[75] Inventors: Bertram George Poynton, Bromham; Terry John Rich; Jeffrey Jerome Sainsbury, both of Kempston, all of England

[73] Assignee: Fords (Finsbury) Limited, Bedford, England

[22] Filed: Dec. 21, 1971

[21] Appl. No.: 210,351

[30] Foreign Application Priority Data

Feb. 11, 1971 Great Britain..................4,489/71

[52] U.S. Cl..........................250/220 M, 250/223 B
[51] Int. Cl..........................G06m 7/00, H01j 39/12
[58] Field of Search..................250/223 B, 220 M, 250/211 J

[56] References Cited

UNITED STATES PATENTS 3,292,785  12/1966  Calhoun..........................250/223 B Primary Examiner—James W. Lawrence
Assistant Examiner—T. N. Grigsby
Attorney—Joseph F. Brisebois et al.

[57] ABSTRACT

An integrated photocell device for bottle inspection comprises a multiplicity of inspection photodiodes and a level sensing photodiode, which measures the average light transmission through a bottle, arranged in a suitable array for scanning an area of a bottle to be inspected. The level sensing diode is in the form of a grid distributed over the photocell device and the inspection diodes are disposed within the grid. The inspection diodes are each connected in an electrical circuit which is adapted to be triggered by a pulse applied thereto and to restore to its initial state within a time determined by the intensity of the illumination of the photodiode. The individual inspection circuits are connected in parallel to a load resistor, the output voltage across which drops to zero when all the circuits have restored to their initial states. The level sensing diode is connected in a similar circuit to each inspection diode and is connected to a separate load resistor. Means is provided for comparing the times taken for the two output voltages to return to zero, after the application of a pulse, in order to determine whether or not a bottle being scanned by the device should be rejected as being dirty or faulty.

7 Claims, 7 Drawing Figures

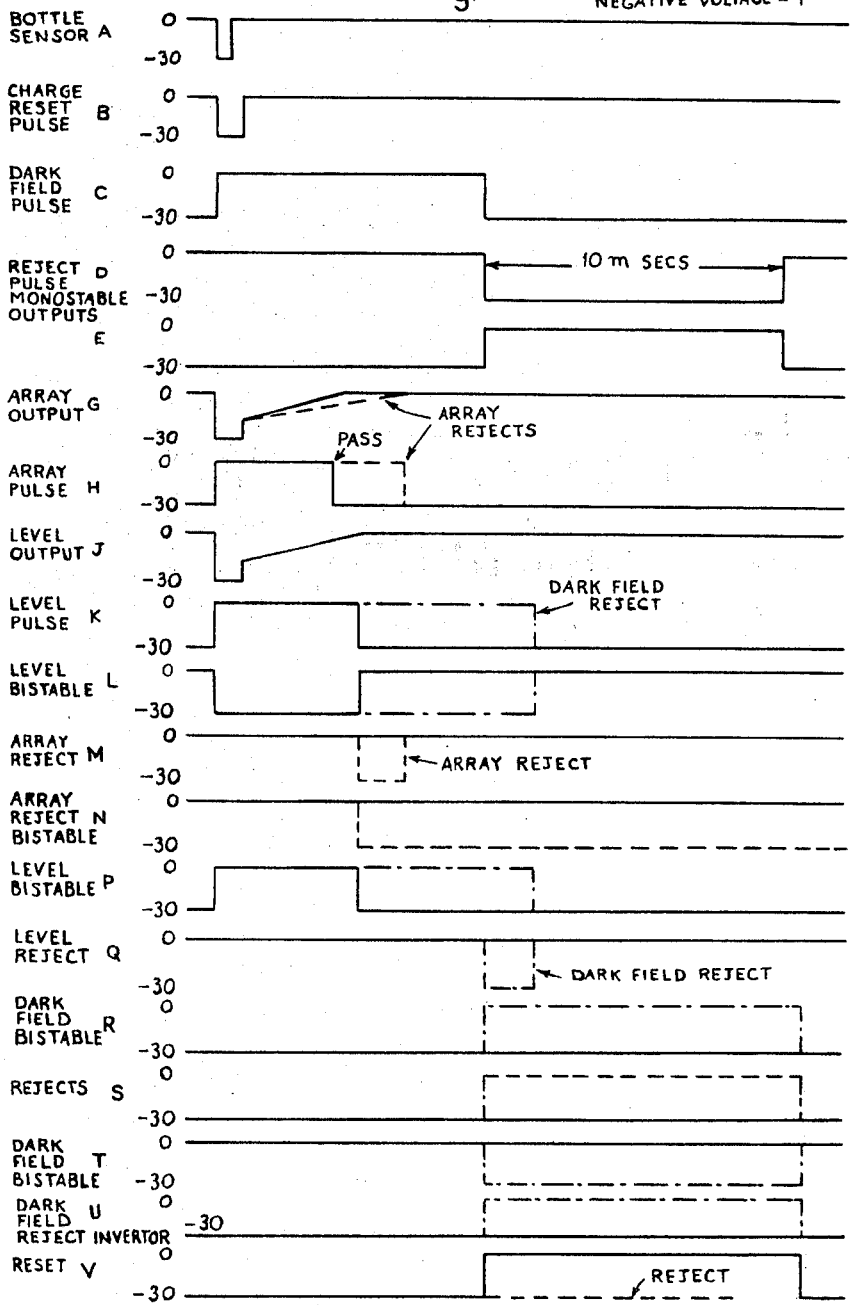

BOTTLE INSPECTION APPARATUS

The present invention relates to apparatus for the detection of dirt or foreign bodies in transparent bottles and other containers before they are filled and offered for sale, particularly in bottles such as milk or beer bottles which are re-used after washing.

Machines are known which inspect the bottle by optically scanning the base and/or side walls by light projected therethrough. The scanning techniques used generally involve high speed rotation of the scanning means or bottles by electric motors. The parts are prone to wear and inspection speeds are limited. Lubricant and dust from driving belts can be deposited on lenses and optical surfaces necessitating regular cleaning of these important components.

Developments in the semi-conductor art have made it possible to design arrays of photodiodes and associated circuitry in very small devices, which may be hermetically sealed, and the present invention has for an object to provide apparatus for inspecting bottles or the like which incorporates an integrated photocell device comprising an array of photodiodes and associated circuitry which enables a static inspection system to be provided which is fast in operation, sensitive, reliable and requires little power for operation.

According to the invention there is provided a photocell device for bottle inspection, comprising a plurality of photoelectric means disposed in a suitable array for scanning an area of a bottle to be inspected, each means being connected in a circuit which is triggered upon initiation of an inspection cycle and restores to its initial state in a time determined by the intensity of the illumination of its associated photoelectric means, the individual circuits being connected in parallel.

Figure 2:
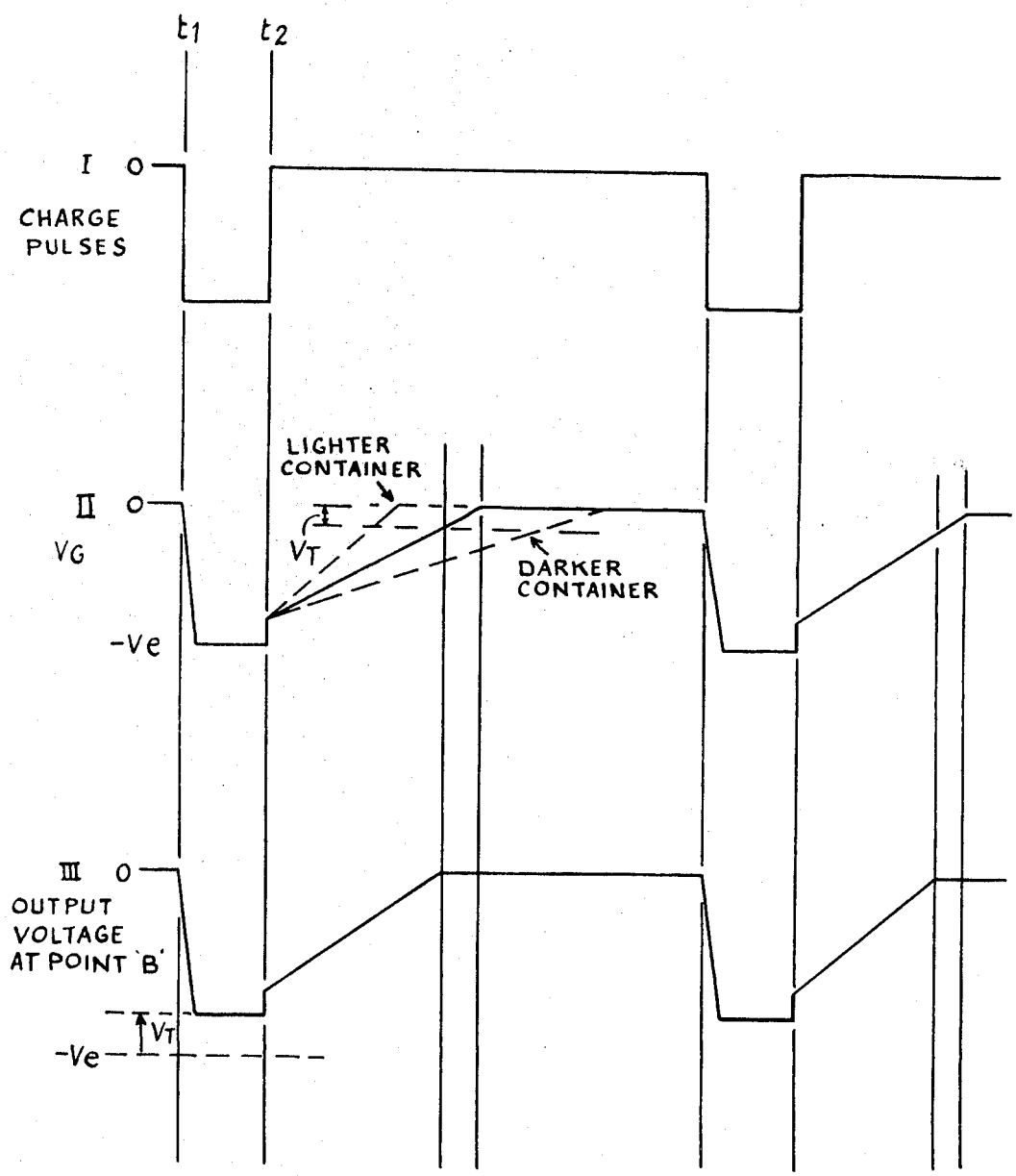
Figure 3:
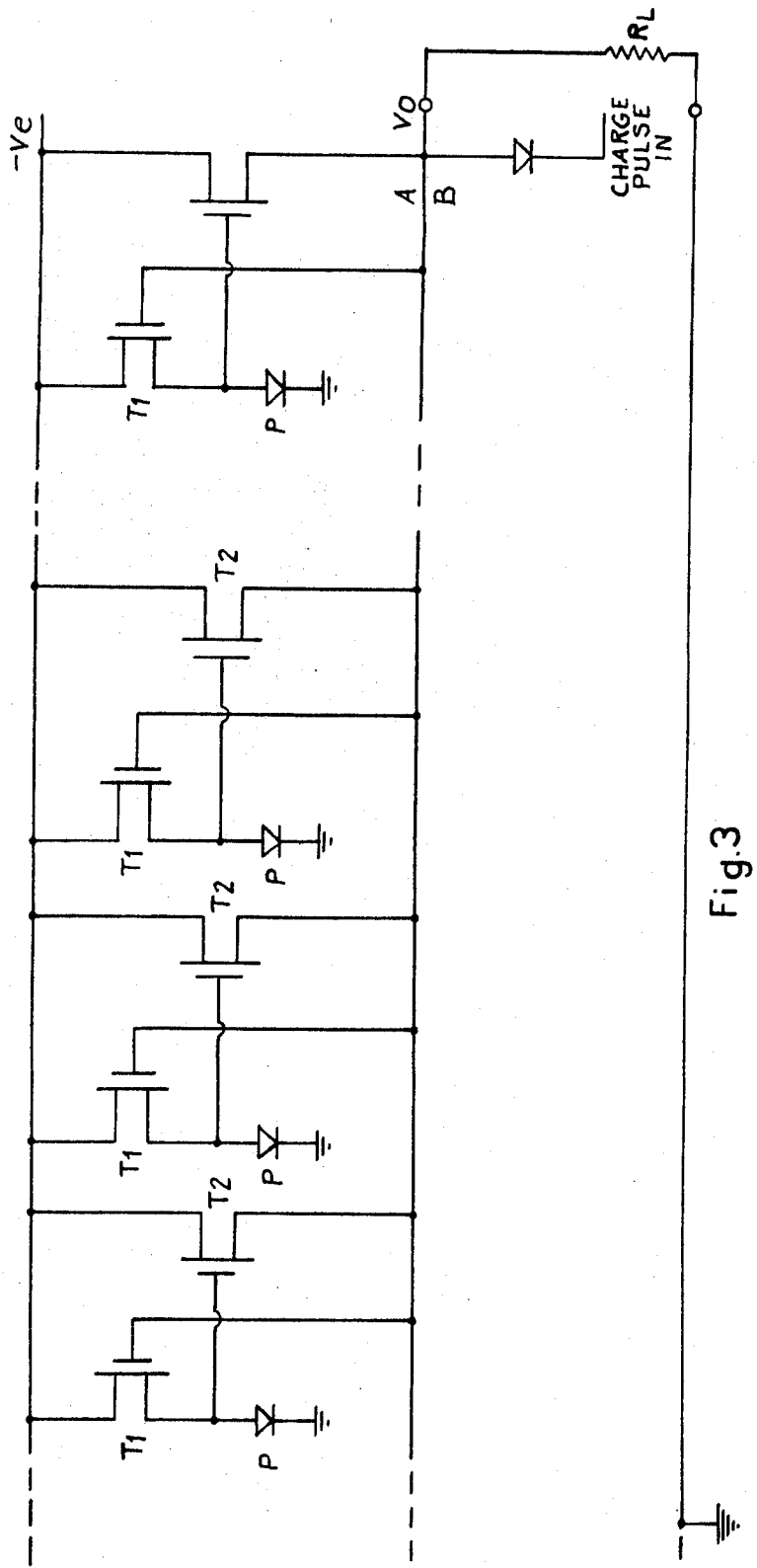
Figure 4:
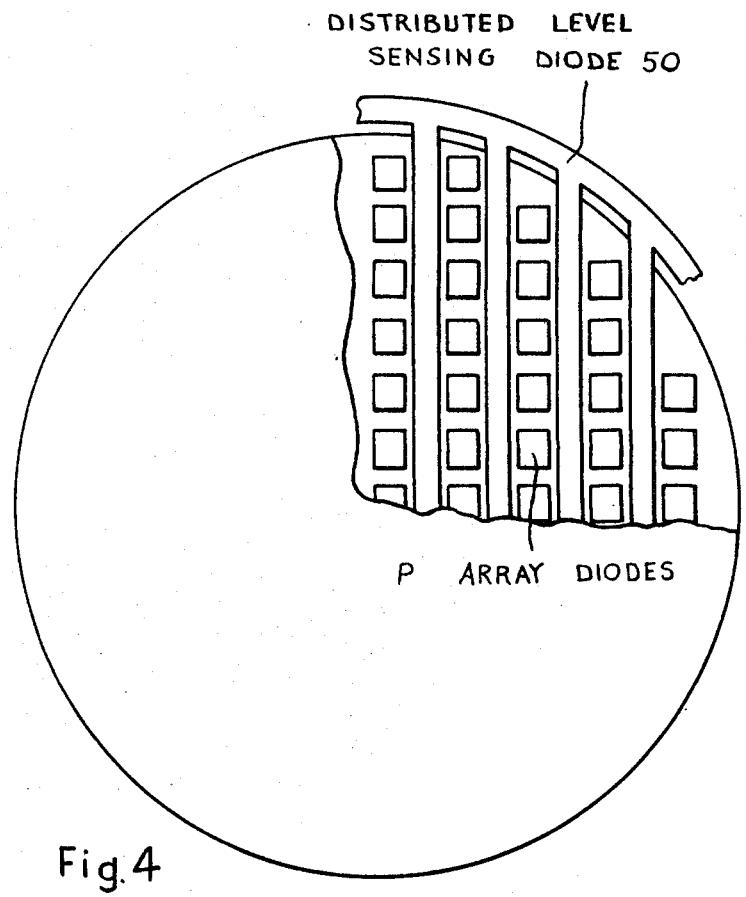
Figure 7:
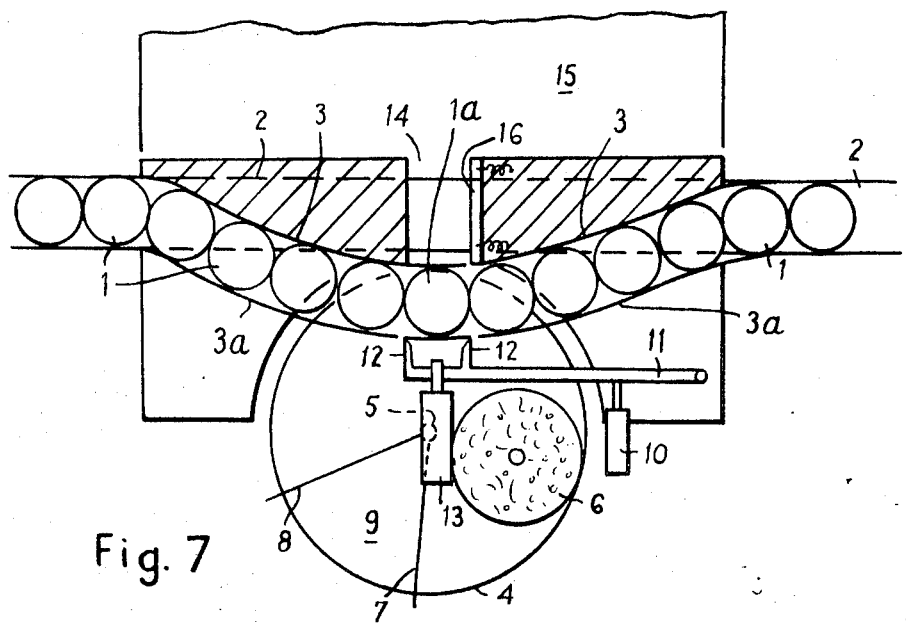
Figure 5:
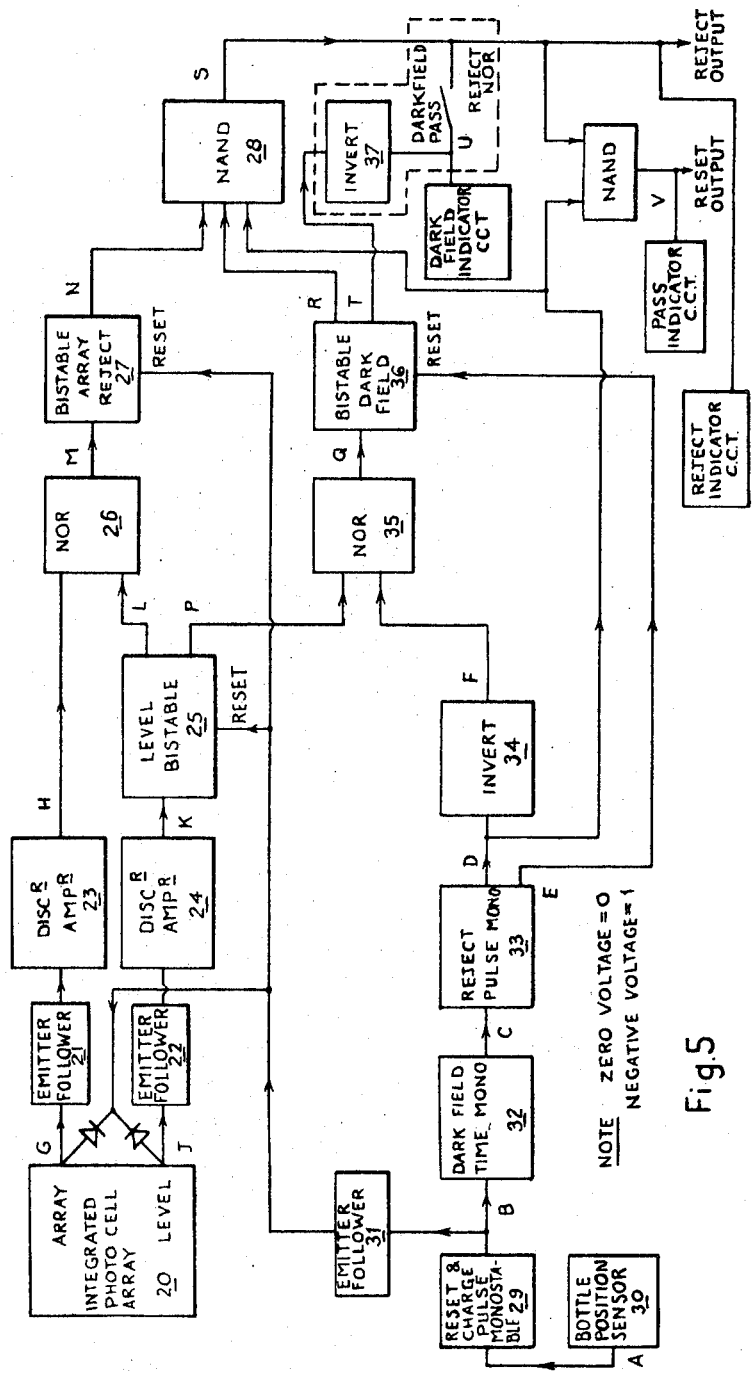

The invention will be described, by way of example, with reference to the accompanying drawings, in which:

FIG. 1 is a circuit diagram of a photocell element comprising a photodiode and associated circuitry suitable for use in an integrated photocell device according to the invention, FIG. 2 shows waveforms at different parts of the photocell element of FIG. 1, FIG. 3 shows part of the circuit of the integrated photocell device, FIG. 4 is a diagram of one form of integrated photocell device suitable for inspecting the bases of bottles, FIG. 5 is a block circuit diagram of one embodiment of the apparatus for bottle inspection, FIG. 6 shows the waveforms at different parts of the apparatus of FIG. 5, FIG. 7 is a schematic view of a base inspection arrangement and rejection system.

FIG. 1 shows a circuit of a photocell element suitable for incorporation in a multi-element integrated photocell device for bottle inspection apparatus according to this invention. The photocell element comprises a photodiode P and two P-channel enhancement metal oxide silicon transistors (MOS transistors) $T_1$ and $T_2$ connected as shown. With such a transistor, no current flows in the source (S)-drain (D) circuit if the gate (G)-source voltage $V_G$ is less negative than a predetermined threshold voltage $V_T$. Another important feature of the MOS transistor is that the gate input resistance is very high. This is particularly so when the transistor is used in the "common drain" or "source follower" configuration, as is $T_2$ in FIG. 1, the output voltage $V_O$ being derived across the load resistance $R_L$.

Transistor $T_2$ isolates the voltages appearing on its gate G from the low impedance load resistance $R_L$. Transistor $T_1$ is effectively a "switch" between the negative supply voltage $-Ve$ and the gate G of transistor $T_2$. By applying a negative voltage $V_G$ of sufficient amplitude to the gate of transistor $T_1$ the "switch" will close and ensure that the voltage at the gate G of $T_2$ will be brought to $-Ve$.

The negative voltage $V_G$ applied to the gate $T_1$ is provided by a series of charge pulses applied to conductor A. As shown in FIG. 2 (waveform I), these pulses are applied to the gate of transistor $T_1$ at time $t_1$. Closing the "switch" causes the capacitance $C_1$ consisting of the capacitance of the reverse-biassed photodiode P, the input capacitance of $T_2$ and stray capacitances, to be charged to the negative voltage $-Ve$. At time $t_2$, when the charge pulse returns to zero, transistor $T_1$ "switch" opens, and the capacitance $C_1$ is isolated from the negative supply $-Ve$. Capacitance $C_2$ (consisting of the intrinsic and stray capacitance between the gate and the source of transistor $T_1$) is also effectively connected in parallel with $C_1$, resulting in a positive-going step in the voltage at the gate G of $T_2$ (FIG. 2, waveform II), and hence on the output voltage $V_O$ (FIG. 2, waveform III) as the charges of the two capacitances re-adjust.

The total capacitance C of $C_1$ and $C_2$ will start to discharge at a rate determined by the leakage currents through transistors $T_1$, $T_2$ and the photodiode P, and also the photoelectric current generated in the diode. Normally the leakage currents are insignificant compared to the photoelectric current, therefore the rate of discharge is determined by this current and hence the illumination on the diode.

As C discharges, the voltage across it falls, and hence the output voltage $V_O$ goes less and less negative until the voltage on the gate of $T_2$ becomes less negative than $V_T$ when $T_2$ will be cut off. The output voltage will then be zero.

Hence, the time required for the output voltage to reach zero after the end of the charge pulse depends on the amount of light received by the diode. A dark diode takes longer to discharge the capacitance C than a more illuminated diode.

For effecting bottle inspection in accordance with this invention a large number of these photocell elements are built up in to a suitably shaped array, and connected in parallel to a common load resistor. FIG. 3 shows a part of the circuit of an array made up from similar elements to those shown in FIG. 1. In order to simplify the array, points A and B in FIG. 1 are connected together. This means that the charge pulses are applied to the same conductor as that from which the output voltage is obtained.

If an image of the container area undergoing inspection is focused on to the array and a charge pulse applied, all the $T_2$ transistors will be turned on. After a period of time, determined by the illumination on the array, all the transistors $T_2$ will be turned off when the voltage applied to their gates reaches the threshold voltage $V_T$. This period of time will be substantially the same for all elements if they are all equally illuminated. If one or more of the diodes are obscured by a foreign body, the associated $T_2$ transistor will not turn off within the normal period. Thus, if the output voltage remains negative after a predetermined time period, this means that one or more of the diodes is obscured and the container being inspected should be rejected. The load resistor and all the $T_2$ transistors effectively form an analogue "OR" gate with a large number of inputs. The time required for all the $T_2$ transistors to turn off will depend on the brightness of the light source and the quantity of light transmitted through the container. In order that both of these variables may be taken into account, the average light transmitted by the container is measured and the time period derived from this measurement. Thus for bottles with a lower light transmission, or if the lamp output falls, the time allowed for the capacitances to discharge is increased.

One method of measuring the average light transmission of the bottle is to use a circuit as shown in FIG. 1 with the photodiode distributed over the photocell device so that the whole of the area being inspected is sampled. This level sensing diode system may be integrated with the array of photodiodes used for inspection. One such integrated photocell device is illustrated in FIG. 4 in which the level sensing diode is in the form of a grid within which the array diodes are disposed. This particular array, which in practice is of very small size, is suitable for inspecting the base of a bottle.

The distributed diode circuit or "level sensor circuit" has its own load resistance and hence develops an output voltage which varies in a similar way to that obtained from one element of the array diodes. The discharge time for the distributed diode is about the same as for an array diode. This is because although the diode capacitance of the distributed diode is increased, its area and hence the photoelectric current generated are also increased. By comparing the time the level sensor circuit takes to switch off with the time the array takes, the presence or otherwise of foreign bodies can be determined. Normally the array is arranged to switch off before the level sensor. If an array diode is obscured the level sensor will switch off first and this condition signifies a reject condition. This condition can be determined by suitable logic circuitry.

If the light through a container is completely obscured or if it falls below a desired minimum level due, for example, to an overall smear, then this condition is detected by comparing the time the level sensor takes to switch off with a fixed time period. Normally the level sensor would switch off within say one millisecond. If it has not switched off after this period, the illumination must be below the prescribed minimum and the container may be rejected if required.

The sensitivity of the array can be adjusted by adjusting the delay period derived from the level sensor. This can be achieved by bringing the $T_2$ gate and diode connection out of the device so that extra capacitance can be connected across $C_1$. Conveniently this extra capacitance can be a small variable capacitor.

FIG. 5 shows a block diagram of one embodiment of a bottle or container inspection system using an integrated photocell device as described above. The integrated photocell device 20 has the outputs from its array diodes at G and its level sensor diode at J fed through emitter followers 21, 22 to discriminating amplifiers 23, 24 respectively. The output K from discriminator 24 is fed to a level bistable device 25, which is reset at the commencement of each inspection cycle, the outputs from 23 and 25 being fed to a NOR gate 26 so that unless the output voltage from the array drops to zero before that of the level sensor the bistable array reject device 27 operates and, through the NAND gate 28, produces a reject output signal.

The reset and charge pulse generator 29 is triggered by the bottle position sensor 30 and, through the emitter follower 31, the charge and reset pulses are fed to the photocell device and other units as shown. Pulses from the generator 29 are also fed to the dark field time monostable device 32 and reject pulse monostable device 33, the output from which at D controls the width of the reject and reset output pulses.

The output at D is also fed via inverter 34 to a NOR gate 35 to which the output from the level bistable device 25 is also fed, the output Q from gate 35 being fed to the bistable dark field reject device 36. The inverter 37 is provided so as to enable the dark field reject circuit to be disconnected if it be decided to eliminate this control.

FIG. 6 shows the waveforms at the various lettered positions of the circuit shown in FIG. 5.

The inspecting system described above may, for example, be used with the base inspection apparatus illustrated in plan in FIG. 7. In this apparatus a queue of bottles 1 moves along the conveyor 2 and is deflected by guide walls 3, 3a so that the bottles slide over the peripheral zone of a translucent circular plate or disc 4 which is rotated slowly by a motor (not shown) about the vertical axis 5. Beneath the peripheral zone of the disc across which the bottles move is disposed the inspection light source. The disc 4 is preferably made from an opal plastics material, such as, opal polycarbonate sheet marketed by Farbenfabriken Bayer AG under the trade mark "Makrolon," so as to diffuse the light from the light source. The base of the bottle is inspected by means of an integrated photocell device as hereinbefore described disposed above the mouth of the bottle, whereby to produce a reject output signal if dirt, a fault or a foreign body is detected.

The upper surface of the disc is cleaned as the disc rotates, for example by a rotary brush 6 which may be supplied with a drip feed of detergent, after which the disc moves under and in contact with two squeegee wiper blades 7 and 8 between which clean rinse water is applied to the surface of the disc at 9. The first wiper blade 7 squeegees away the detergent liquid and the second wiper blade 8 squeegees away the rinse water.

Experiments have shown that despite the passage of the bottles thereover, the rotation of the disc enables its upper surface to be maintained in reasonable optical condition, whereas orientated scratch patterns arise if the plate is stationary which can cause difficulty with the inspection. Furthermore, dirt streaks which would accumulate over a period of time and also interfere with the inspection, are cleaned away by the washing or cleaning process.

After passing the inspection zone the bottles 1 are returned to the conveyor 2, those which have produced a signal indicating dirt being rejected from the line. In the event of a reject output signal being produced, an electric or pneumatic actuator 10 is operated which moves a lever arm 11 towards the bottle 1a in the inspection position to cause fingers 12 on the arm to project into the path of movement of the bottles at opposite sides of the bottle 1a, thus arresting movement of bottle 1a and also of the queue of bottles upstream thereof. As soon as the bottle 1a is arrested, an ejector device 13 is actuated to push the reject bottle 1a through a gap 14 in the opposing guide wall 3 to a collecting area 15 for reject bottles. The gap 14 may have a spring-pressed side wall 16 for holding the rejected bottle, and the gap walls may be so arranged that a reject bottle is deflected thereby into the area 15 by the movement of the conveyor 2 therebeneath. As soon as the bottle is rejected, the ejector device 13 and the arm 11 move back to their original positions and inspection of the queue of bottles again commences.

Whilst particular embodiments have been described it will be understood that various modifications may be made without departing from the spirit of the invention. For example, an integrated photocell device can be used for inspecting the side wall of a bottle using techniques as above described with a different shape for the array.

We claim:

1. A photocell device for inspecting transparent bottles and other containers comprising:
   a. a multiplicity of inspection photoelectric means disposed in an array corresponding to an area of a container to be scanned thereby,
   b. a multiplicity of electrical circuits connected respectively to said photoelectric means,
   c. each individual circuit being adapted to be triggered by a charge pulse applied thereto and to restore to its initial state within a time determined by the intensity of the illumination of its associated photoelectric means,
   d. said multiplicity of circuits being connected in parallel to inspection output means which produces an inspection signal indicative of when all the circuits have restored to their initial states, and
   e. charge means for applying a charge pulse to said circuits upon initiation of each inspection cycle.

2. A photocell device as claimed in claim 1, including level sensing photoelectric means for measuring the average illumination of the photocell device, said level sensing photoelectric means being distributed throughout the array of inspection photoelectric means so that the whole of the area being scanned is sampled, said level sensing means being connected to a further electrical circuit which is adapted to be triggered by each said charge pulse and to restore to its initial state in a time determined by the average illumination of said level sensing means, and said further circuit being connected to level sensing output means which produces a level sensing signal indicative of when said further circuit restores to its initial state, and means for applying each charge pulse to said further circuit upon initiation of each inspection cycle.

3. A device as claimed in claim 2, including comparing means for comparing the time periods taken by both said output means to produce said output signals subsequent to a charge pulse, said inspection photoelectric means and associated circuits being adapted normally to produce said inspection output signal prior to said level sensing output signal, and said inspection output signal being subsequent to said level sensing output signal if the illumination of any one of said inspection photoelectric means is obscured by dirt in a container.

4. A device as claimed in claim 3, including means for comparing said time period for said level sensing output signal with a predetermined, fixed time period, whereby to detect when the light passing through a container falls below a desired minimum level.

5. A device as claimed in claim 4, including a voltage source and wherein said inspection circuits and the level sensing circuit each comprises two MOS transistors, each of which includes source, drain and gate electrodes, means connecting the photoelectric means in series with the source-drain circuit of a first one of said transistors and across said voltage source, means connecting the gate of said first transistor to said charge pulse means, means connecting the gate of the second transistor to the junction between said photoelectric means and said first transistor, and means connecting the source-drain circuit of said second transistor in series with said output means and across said voltage source.

6. In bottle inspection apparatus, a photocell device as claimed in claim 5 comprising integrated inspection photodiodes and a level sensing photodiode, said level sensing diode being in the form of a grid within which the array of inspection diodes is disposed, and said integrated diodes being in the form of a circular array adapted to scan the base of a container being inspected and being positioned above the mouth of said container, a light source disposed below the container for illuminating the base thereof, and rejection means actuated in response to the comparing means detecting dirt in the base of the container.

7. A device as claimed in claim 2, including integrated inspection and level sensing photodiodes, the level sensing diode being in the form of a grid within which is disposed the inspection diodes, and the whole array being of circular configuration adapted to scan the base of a container, a negative voltage terminal, a common terminal, and an earth terminal, each inspection circuit comprising two MOS transistors having source, drain and gate electrodes, means connecting an inspection photodiode in series with the source-drain circuit of a first one of said transistors between said negative and earth terminals, means connecting the gate of said first transistor to said common terminal, means connecting the gate of the second transistor to the junction between said first transistor and said photodiode, and means connecting the source-drain circuit of said second transistor between said negative and common terminals, an output load resistor connected between said common and earth terminals, and means for applying the charge pulses to said common terminal.

* * * * *